(12) United States Patent
Sullivan

(10) Patent No.: US 6,569,390 B1
(45) Date of Patent: May 27, 2003

(54) LIQUID-LIQUID EXTRACTION TRAYS

(75) Inventor: Lawrence E. Sullivan, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/565,042

(22) Filed: May 4, 2000

(51) Int. Cl.[7] ............................................... B01D 11/04
(52) U.S. Cl. ........................ 422/256; 208/226; 422/257
(58) Field of Search ............................... 422/256, 257; 208/226

(56) References Cited

U.S. PATENT DOCUMENTS

| 3,179,389 A |   | 4/1965  | Nutter ......................... 261/114 |
| 4,207,174 A | * | 6/1980  | Christman ................ 196/14.52 |
| 4,234,544 A | * | 11/1980 | Christman ................ 196/14.52 |
| 4,247,521 A |   | 1/1981  | Forte et al. .................. 422/256 |
| 5,500,116 A |   | 3/1996  | Nakayama et al. .......... 210/511 |
| 5,643,541 A | * | 7/1997  | Peddicord et al. ............. 108/90 |
| 5,788,933 A | * | 8/1998  | Peddicord ................. 108/51.11 |
| D439,303 S  | * | 3/2001  | Peddicord et al. .......... D23/207 |

OTHER PUBLICATIONS

"Package Trays for Pipe–Size Process Vessels" Bulletin PT–1, Nutter Engineering, No Date Available.

* cited by examiner

*Primary Examiner*—Krisanne Thornton
(74) *Attorney, Agent, or Firm*—John G. Tolomei; Frank S. Molinaro; Mark Goldberg

(57) ABSTRACT

Cartridge type extraction trays for use in a small diameter liquid-liquid extraction column comprise a novel vertical wall which surrounds the active (perforated) area of the tray. This wall extends upward to a sufficient height to retain the heavy liquid on the active area of the tray preventing the heavy liquid from reaching the edge of the tray when it may possibly leak downward due to a gap between the edge of the tray and the inner surface of the column wall.

8 Claims, 2 Drawing Sheets

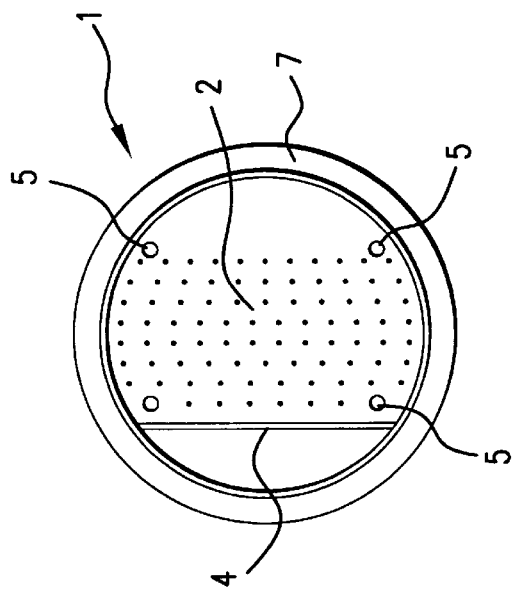
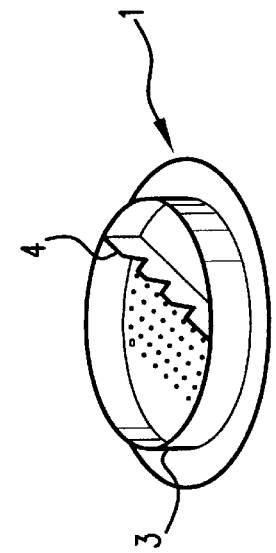
FIG.2
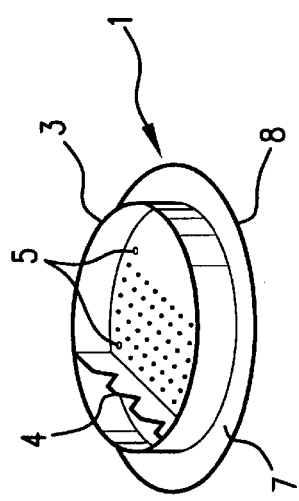
FIG.1
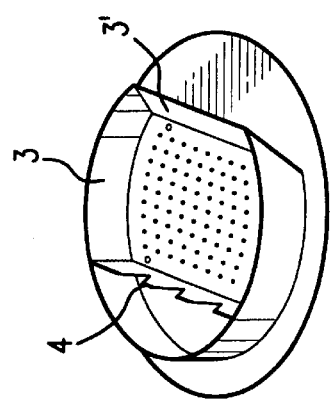
FIG.4
FIG.3

LIQUID-LIQUID EXTRACTION TRAYS

FIELD OF THE INVENTION

The invention relates to a multi-tray apparatus for performing multistage countercurrent liquid-liquid extraction in a vertical column. The invention more specifically relates to a multi-tray apparatus which is mounted as a unit within a small diameter extraction column.

BACKGROUND OF THE INVENTION

Liquid-liquid extraction is a commercially practiced process used to separate one component or class of components from a mixture. The liquid-phase feed stream is contacted with a liquid-phase solvent which is not miscible with the feed stream but which has a high capacity for dissolving the desired components of the feed stream. The success of an individual extraction step is often limited by many factors which hinder mass transfer and the quick establishment of equilibrium between the two liquid phases which are being brought into contact. Often several sequential extractions are required to reach a target recovery or purity. For these reasons many liquid-liquid extraction processes are performed using multiple contacting and separation steps performed in sequence with countercurrent flow of the two liquid streams. This can be done in vertical extraction columns through which the two liquids flow in opposite directions, with one phase flowing through openings in an active area of horizontal trays while the other phase flows horizontally past the openings of the contacting stages. The phase which flows horizontally across the tray then moves vertically to the next tray and stage of contacting, typically by means of enclosed conduit or channels.

RELATED ART

U.S. Pat. No. 5,500,116 issued to T. Nakayama et al. illustrates in FIGS. 11 and 12 a conventional countercurrent flow system used in a liquid-liquid extraction column. In this flow system the "light" phase flows upward through the trays as the discontinuous phase and the "heavy" phase flows upward through channels and horizontally across the tray.

U.S. Pat. No. 4,247,521 issued to P. Forte describes several liquid-liquid tray designs and describes their operation. This reference shows several forms of "upcomers" for carrying the less dense liquid above the active area of the tray.

Cartridge trays are used in small diameter fractional distillation columns fabricated using large diameter pipe as the outer wall of the vessel. One or more bundles of trays are lowered into a vertical pipe to produce the column. As the edge of the tray is not attached to the wall of the pipe, a movable or flexible seal is usually provided at the edge of the tray. The construction of several forms of commercially available "package trays" is illustrated in a sales bulletin PT-3 published by the Nutter Engineering unit of the Harsco Corporation. This reference illustrates the circular trays fastened into unitary bundles and also shows the provision of seal rings at the edge of the trays.

The construction and operation of package trays is also described in U.S. Pat. No. 3,179,389 issued to I. E. Nutter. This specific reference is directed to vapor-liquid contacting trays such as used in fractional distillation. FIGS. 1 and 14 do however show multiple horizontal trays 36 held in position by four support rods. Downcomers 40 guide the descending liquid phase. This reference illustrates the use of a seal ring 46 at the periphery of the tray.

BRIEF SUMMARY OF THE INVENTION

The invention is an improved design for a liquid-liquid extraction tray which finds application in cartridge type columns. The subject tray includes a partially circular wall which encircles the active area of the tray to lessen any leakage of dense phase liquid around the seal at the edge of the tray.

A broad embodiment of the invention may be characterized as an apparatus for installation into a vertical column used in a liquid-liquid extraction process, which apparatus comprises a plurality of discoid trays adapted to fit within the column in a horizontal plane with each tray comprising a seal ring, which engages the inner surface of the column, a perforated central active area, a chordal riser conduit on one side of the tray and a vertical wall surrounding the active area of the tray at a predetermined distance inward from the periphery of the tray.

BRIEF SUMMARY OF THE DRAWING

FIG. 1 is a view of a liquid-liquid extraction tray having a circular weir 3 surrounding the perforated active area of the tray.

FIG. 2 is an overhead view of the tray of FIG. 1.

FIG. 3 is a view of a tray similar to FIG. 1 but having an inclined chordal weir section opposite the riser 4.

FIG. 4 is a view of an alternative design similar to the tray of FIG. 1 but having a relatively shorter chordal riser wall 4.

DETAILED DESCRIPTION AND PREFERRED EMBODIMENTS

Figure 5:
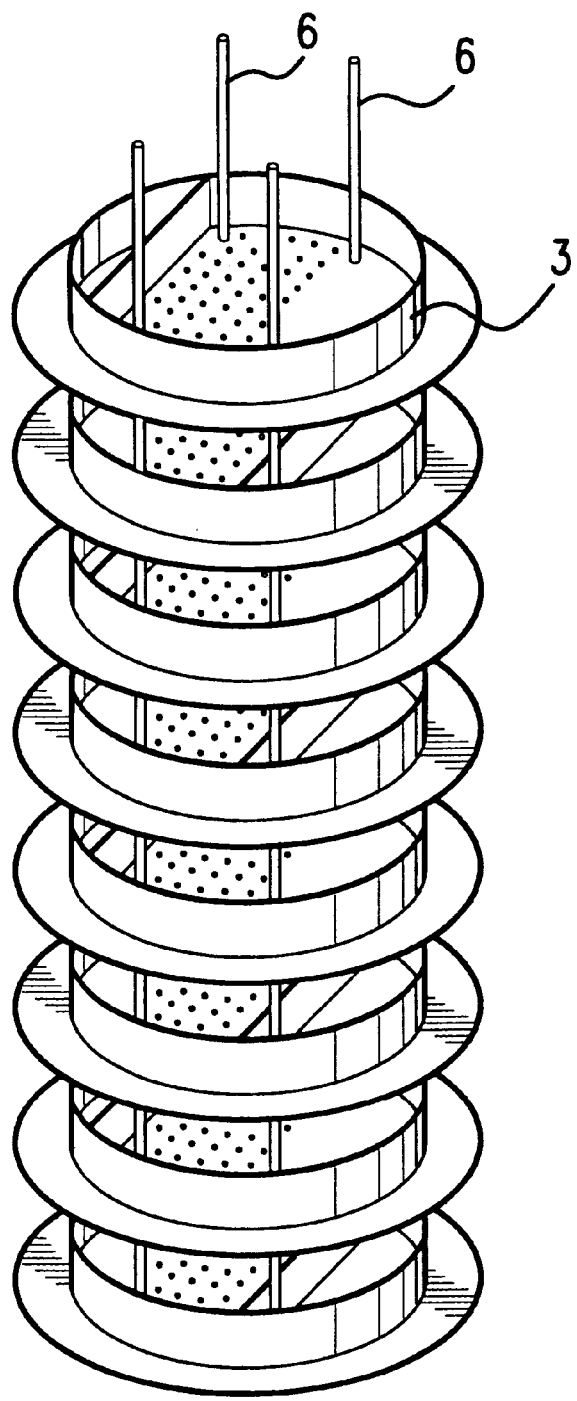
FIG. 5 is a drawing showing eight trays similar to that of FIG. 1 supported by four rods which hold the trays in position in a column.

Liquid-liquid extraction is a useful unit operation for transferring a compound or class of compounds from one liquid stream to another. The purpose of this transfer can be to purify the feed stream being acted upon when the extracted compounds are viewed as an impurity or to recover valuable compounds from the feed stream when the extracted compounds are a process product or valued process input. A liquid-liquid extraction process comprises contacting two immiscible or partially miscible liquid phases, such as an oil and a solvent, with sufficient agitation to allow some transfer of the desired compound between the phases followed by separation of the two liquids. Commonly the two immiscible liquids differ significantly in density so that they can be readily separated by a simple settling step. This process is commonly performed in vertical columns having countercurrent flow of the denser (heavy) phase against the less dense (light) phase.

When liquid-liquid extraction is performed in a conventional trayed column one phase will flow vertically through a perforated section occupying much of the central region of the tray. The other phase will move horizontally from side to side across the tray. This horizontal movement may be below the tray or above the tray. The passage of the one phase through the active area promotes extraction by inducing turbulence and mixing at the openings of the active area and also by breaking the phase into smaller quantities having an overall greater surface area. For instance, the heavy phase may pass downward through the openings and "rain"

through the continuous phase of the less dense liquid trapped under the tray. Alternatively, the light phase may rise through the active area as the heavy phase travels across the top of the tray. A weir extends above or below the tray as appropriate to trap a quantity of the phase which is to pass through the active area. This trapped layer provides the hydraulic head which pushes the trapped phase through the openings of the active area.

One commercially practiced liquid-liquid extraction process is the removal of butadienes from $C_4$ streams. Another widely practiced extractive separation is the recovery of aromatic hydrocarbons from a mixture which also contains hydrocarbons having other molecular structures such as paraffins. For instance, large quantities of benzene and other aromatic hydrocarbons having great value as petrochemical feedstocks are recovered by extractive distillation from mixtures containing other types of hydrocarbons. Extraction is also used in the recovery of active materials from fermentation broths, the recovery of metals such as copper and rare earths, and the recovery of caprolactam for nylon production.

While these extraction processes are often carried out in very large scale operations requiring large diameter columns, there are many instances when such large scale equipment is not needed. For instance, if it desired to perform a very easy separation then only minimal contacting may be required. Alternatively the quantity to treat may not be large enough to warrant a large dedicated vessel or the replacement of an existing vessel. This could result from a desire to only incrementally increase the capacity of an existing extraction unit. One possible approach in these instances is to employ a "cartridge" extraction column. These systems are preassembled multi-tray bundles which are placed in a vertical section of large diameter pipe and employed as an extraction column. This greatly reduces the cost of the column. It also facilitates construction of the column since it would be very difficult to assemble such a small diameter column in the field due to the very small working area available within a column having a diameter which may be only 24 to 30 inches (61–76 cm)

It is customary, as shown in the brochure by Nutter Engineering referred to above, to provide a seal at the edge of the trays used in fractional distillation. This can range from a spring-loaded device to a simple flexible seal which extends from the edge of the tray. This seal is intended to force all of the rising and falling liquids to pass through the intended flow paths on the tray. As the seal must be flexible or movable to allow insertion and removal of the tray bundles, and as the pipe may not be perfectly round, gaps may still be present at the edge of the tray allowing some of the liquids to bypass a tray and escape the desired contacting. Unfortunately these seals are not without problems and difficulties which limit their usefulness. For instance, if the seal is made to engage the inner surface of the pipe in a very active manner which ensures a good seal against vertical fluid passage, then it is likely that movement of the seal through the pipe will require significant force. When this is multiplied times the number of individual trays in a tray bundle, it can be very difficult to move the bundle as required during installation or removal for inspection and/or cleaning.

Another problem inherent with cartridge tray seals is encountered when there is a variation in the diameter or roundness of the pipe due to dents, bends or other distortion. The seals are only intended to adapt to a design tolerance and any departure of the pipe from perfect roundness can result in a potential gap which would allow liquid to leak past the tray. The leak could result in the denser liquid which rests on the upper surface of the tray bypassing the active area of the tray. Depending on the design and operation of the column it could alternatively allow the less dense phase to bypass the active area by rising around the tray. Either situation reduces the effectiveness of the tray and therefore of the overall column. The subject invention is directed to an improved baffle construction located on the upper side of the trays to retain downward flowing liquid on the tray and limit bypassing through any gap left between the edge of the tray and the inner surface of the vessel. It is an objective of the subject invention to provide a cartridge tray design which is less prone to leakage of denser liquid around the seal at the edge of the tray.

The subject invention employs a vertical wall which surrounds the active area of the tray and divides it from the edge of the tray. This wall separates the active area from the seal such that heavy liquid resting on the active area must flow over the wall to reach the area above the seal. The denser liquid phase which flows into the area surrounded by this wall is therefor prevented from reaching the seal area at the outer edge of the tray unless the level of the denser fluid rises above the top of the wall. As the desired level of the heavy liquid is less than the height of the wall, this wall reduces any leakage of the denser liquid through a gap in the seal at the edge of the tray during normal operation.

The invention is most easily envisioned by reference to the drawing. FIG. 1 illustrates a preferred configuration of an individual tray according to the subject invention. In the center of the tray 1 is a region referred to as the active area 2 of the tray. This region has numerous relatively small openings. The denser liquid is intended to pass downward through these openings as a large number of small droplets, thus maximizing the surface area of the dense phase liquid which is exposed to a continuous phase layer of the less dense liquid which is under the tray. This mode of operation has resulted in this type of tray being referred to as a raindeck. The less dense phase flows slowly across the bottom of the tray and enters a "riser", which is a structure which confines the light phase as it moves upward toward the next higher tray. The riser's main functions are to collect the light phase and deliver it to the underside of the next higher tray without entraining any of the heavy phase retained on top of the tray. The riser can take many forms as long as it fulfills these functions and need not extend upward the full distance to the next tray. Often the riser is formed on one side of the tray by a volume enclosed by a portion of the cylindrical wall of the outer vessel and a flat chordal wall 4 of the drawing. The riser can be located in other locations and formed by a separate structure which does not employ any part of the column wall. The riser is shown on the left hand side of the tray of FIG. 1 and an opposing imperforate area is located on the right hand side of the tray deck. This imperforate area functions as the top or roof of the riser of the tray below. In the tray of FIG. 1 the light phase liquid ascends through the riser on the left-hand side of the tray. On the next tray above the weir will be on the opposite side of the tray. The light phase then moves across the bottom of the tray above and enters another riser tracing a sigmoidal path upward through the column. At the same time droplets of the dense liquid fall through the light phase and collect in the central portion of the tray encircled by the retention wall 3. The droplets coalesce into a pool of the dense liquid which drains through the active area 2.

The liquid retention wall 3 is preferably formed at least in part by a cylindrical wall as shown in FIG. 1. Part of the retention wall forms a portion of the riser. The height of the wall will normally be about 2 to 6 inches (5–15 cm). It can also be characterized as being equal in height to about one-third to one-half of the tray spacing of the column. The retention wall is set inward from the periphery 8 of the tray 1. The width of this setback from the edge of the tray sets the width of an annular area 7, which may be from about 1 to 4 inches (2.5–10 cm) with the width of the setback being set by the design of the seal ring. This area is referred to herein as the seal ring because any mechanism used to seal the gap between the edge of the tray and the inner surface of the column is affixed to this region of the tray. FIG. 1 also shows the location of two of the four support openings 5 in the deck area of the tray. These openings are for the support rods not shown which hold the tray in position in the column.

FIG. 2 is an overhead view of the tray of FIG. 1. The central location of the perforated active area 2 and the four openings 5 for the support rods are easily seen in this view. The preferred uniform distribution of the perforations in the active area is apparent in this view. These may be circular perforations on the order of about 3/16 to ½ inch (0.5–1.2 cm) in diameter. A variety of alternative perforation shapes, e.g., trapezoids, or alternative structures e.g. flapper valves or fixed valves may be employed on the surface of the tray. This view also illustrates the preferred annular valley formed above the circular seal ring by the inner surface of the column wall, the outer surface of the wall 3 and the curved outer side of the riser. As shown, at least 50 percent of the length of the wall is circular.

The tray variation shown in FIG. 3 is very similar to that shown in FIG. 1. The difference is that the liquid retention wall 3 encircling the active area 2 has a planar section 3' opposite the riser. This planar section 3' is inclined such that it slopes downward toward the active area. In this manner it may collect falling droplets of dense liquid which may be swept toward that edge of the tray. The other portions of the wall 3 can also be inclined in this manner if desired to increase the collection efficiency for the dense phase liquid. The angle of the incline can range from 15 to 75 degrees. The wall would then be in the form of an inverted truncated cone. FIG. 4 illustrates another mechanical variation in the structure of the tray. In this variation the notched chordal wall of the riser section of the tray 1 is shorter than the curved portion of the wall 3 encircling the active area of the tray. This may be arrived at by increasing the height of the wall 3 or by decreasing the height of the notched weir 4. These are just two of the many mechanical variations possible in these components of the tray.

The preceding description of the trays illustrated in the drawing is intended to explain and exemplify the inventive concept and is not intended to limit the scope of the claims.

One embodiment of the invention may accordingly be characterized as an apparatus for installation into a vertical column used in a liquid-liquid extraction process, which apparatus comprises a plurality of trays, each tray adapted to fit within the column in a horizontal plane and comprising a seal ring, which engages at least a portion of the inner surface of the column, a perforated central active area, a chordal riser conduit on one side of the tray and a vertical liquid retention wall surrounding the active area of the tray at a predetermined distance inward from the periphery of the tray, with the liquid retention wall having a planar section in common with the chordal riser conduit; and vertical tray support bars extending through the trays and securing the multiple trays into a unitary bundle which may be placed into the column, the trays being spaced at a uniform tray spacing along the support bars The more complicated structure of FIG. 5 is simply many individual trays 1 similar to that shown in FIG. 1 mounted on four support bars 6. The trays are fixed to the support bars in a manner which prevents their movement and then the entire structure is inserted into a section of pipe to form the extraction column. The trays are uniformly spaced apart at a tray spacing of from about 8 to 20 inches (20–50 cm). The tray spacing is typically equal to more than twice the height of the circular portion of the liquid retention wall An additional feature seen in this figure is that the location of the riser alternates from side to side on vertically adjacent trays to facilitate a sigmoidal flow path for the lighter phase up the column. Other than the structure of the trays, all other portions of the extraction column may be of conventional design. The column is used in processes operated at conventional conditions including a pressure sufficient to maintain liquid phase conditions and a temperature chosen based upon its effect on solubility and extraction efficiency. Either the heavy phase entering at the top of the column or the light phase entering at the bottom of the column may be the solvent phase, with the other phase being a feed stream containing the compound(s) which it is desired to transfer.

What is claimed is:

1. An apparatus for use and installation in a vertical liquid-liquid extraction column which apparatus comprises a plurality of trays, each tray adapted to fit within the column in a horizontal plane, and comprising a seal ring, which engages the inner surface of the column, a perforated central active area, a chordal riser conduit on one side of the tray and a continuous vertical liquid retention wall surrounding the active area of the tray at a predetermined distance inward from the periphery of the tray and separating the perforated area from the seal ring.

2. An apparatus for use and installation in a vertical liquid-liquid extraction column which apparatus comprises:
   (a) a plurality of trays, each tray adapted to fit within the column in a horizontal plane and comprising a seal ring, which engages the inner surface of the column, a perforated central active area, a chordal riser conduit on one side of the tray and a vertical liquid retention wall surrounding the active area of the tray at a predetermined distance inward from the periphery of the tray; and
   (b) retention members extending through the trays and securing the trays into a bundle which may be placed into the column as a unitary structure, the trays being spaced apart at a uniform tray spacing equal to more than twice the height of the liquid retention wall.

3. The apparatus of claim 2 wherein at least 50 percent of the vertical wall surrounding the active area of the tray is circular.

4. The apparatus of claim 2 wherein the vertical wall surrounding the active area of the tray comprises a chordal wall parallel to the surface of the chordal riser which faces the active area of the tray.

5. The apparatus of claim 2 wherein the vertical liquid retention wall surrounding the active area of the tray extends upward from the plane of the tray, as defined by the active area, to a height greater than that of the chordal riser conduit.

6. The apparatus of claim 5 wherein the apparatus comprises at least six trays.

7. An apparatus for installation into a vertical column used in a liquid-liquid extraction process, which apparatus comprises:
   (a) a plurality of trays, each tray adapted to fit within the column in a horizontal plane and comprising a seal ring, which engages at least a portion of the inner surface of the column, a perforated central active area, a chordal riser conduit on one side of the tray and a vertical liquid retention wall surrounding the active area of the tray at a predetermined distance inward from the periphery of the tray, with the liquid retention wall having a planar section in common with the chordal riser conduit; and (b) vertical tray support bars extending through the trays and securing the multiple trays into a unitary bundle which may be placed into the column, the trays being spaced at a uniform tray spacing along the support bars.

8. The apparatus of claim 7 wherein the liquid retention wall has a chordal portion opposite to and parallel to the flat wall of the riser conduit.

\* \* \* \* \*